W. ARTHUR.
INTUMESCENT MATERIAL AND PROCESS OF MAKING THE SAME.
APPLICATION FILED JAN. 8, 1912.

1,041,565. Patented Oct. 15, 1912.

Witnesses:
George H. Tilden
J Ellis Glen

Inventor:
Walter Arthur,
by Albert H. Davis
His Attorney.

UNITED STATES PATENT OFFICE.

WALTER ARTHUR, OF SCHENECTADY, NEW YORK, ASSIGNOR TO GENERAL ELECTRIC COMPANY, A CORPORATION OF NEW YORK.

INTUMESCENT MATERIAL AND PROCESS OF MAKING THE SAME.

1,041,565.     Specification of Letters Patent.     Patented Oct. 15, 1912.

Application filed January 8, 1912. Serial No. 669,970.

*To all whom it may concern:*

Be it known that I, WALTER ARTHUR, a citizen of the United States, residing at Schenectady, county of Schenectady, State of New York, have invented certain new and useful Improvements in Intumescent Material and Processes of Making the Same, of which the following is a specification.

Materials having a cellular structure and very low apparent density and enough rigidity as to bear their own weight are of importance in the technical arts as heat insulators.

In accordance with my invention a material of extremely low apparent density and low heat conductivity is produced by breaking up or comminuting a viscous material containing water or other volatile material and then heating the particles to a temperature at which the water is rapidly eliminated. This causes each particle to swell up to form a very light, cellular or frothy body. Preferably the intumescence of the particles is caused by bringing them into contact with a heated surface and agitating to prevent adhesion of the particles to each other or to the heated surface.

The accompanying drawings illustrate one form of apparatus suitable for carrying out my invention.

Figure 1:
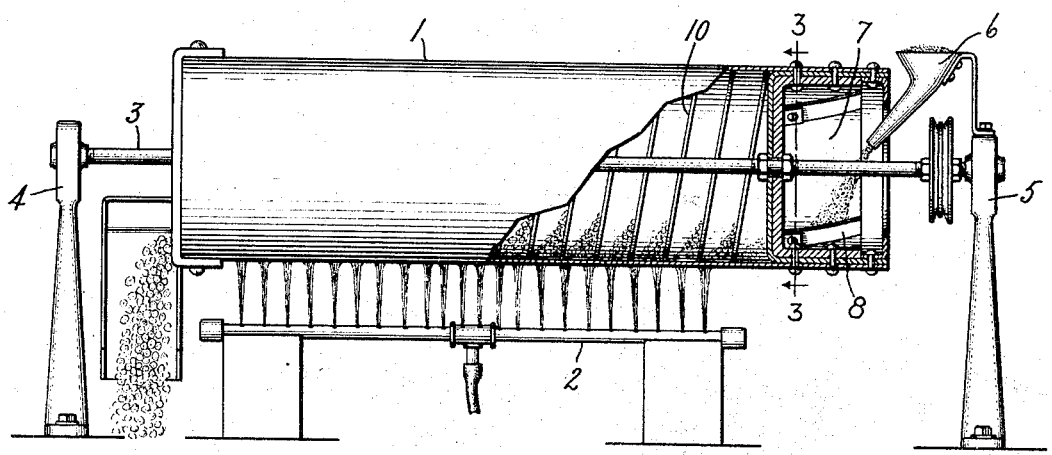
Figure 2:
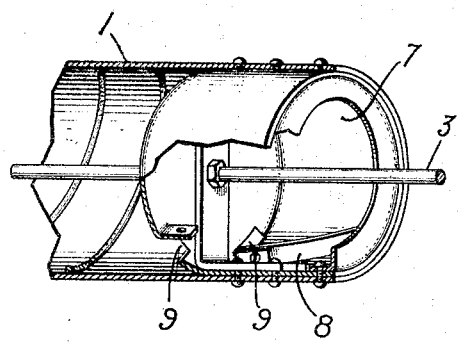
Figure 3:
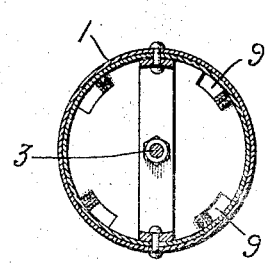

Figure 1 is a perspective view of a drum for heating the comminuted material, and Figs. 2 and 3 illustrate the ends of the drum with greater detail.

According to one method of preparing the above material I may take a soluble silicate such as sodium or potassium silicate and evaporate all but 15 to 30 per cent. of the water by heating. Preferably I aim to leave about 20% of water in the material but at any rate I desire to produce a material brittle enough to be broken up into particles. These particles are preferably segregated as by sifting so as to retain only particles retained by a sieve having 40—60 meshes per square inch, but finer material, or particles retained by a 20 mesh sieve will give satisfactory results.

The pulverulent material thus obtained is fed into an apparatus such as illustrated in Fig. 1 in which the particles are heated while being agitated. The particular form of apparatus here shown consists of an iron cylinder 1 heated by gas jets issuing from the pipe 2. A cylinder is attached to a shaft 3 which is supported by bearings 4—5. The material is fed into a hopper 6 from which it enters into a chamber 7 at one end of the cylinder 1. In this chamber it is caught by a series of baffle plates 8 which are set at an angle so as to feed the material forward and cause it to enter in small portions through openings 9, best shown in Figs. 2 and 3 into the main portion of the rotating cylinder. The material is fed progressively toward the other end of the cylinder and maintained in agitation by the helical ridges 10 within the cylinder. The gas flames are so regulated that the walls of the cylinder are maintained at a temperature of 300 to 400 degrees C. The heat causes the rapid evaporation of the water in the material thus causing the particles to swell up to form light, frothy pellets which have a volume anywhere from 30 to 100 times greater than the original particles. As each particle of the previously crushed and sized silicate is intumesced while the particles are maintained separate from each other by agitation, the product consists of discrete or distinct puffed-up pellets or bubbles. These pellets of intumesced silicate have an apparent density of .01 to .03, in other words, a given volume of said material has a density of .01 to .03.

It is not necessary that the silicate having the right proportion of water shall be produced by first making a solution and then removing part of the water. The silicate having the desired proportion of water can be directly produced by fusing silica, sodium carbonate or other alkaline material in proper proportions and then heating with the desired amount of water in an inclosed receptacle to make a material having the proper water content.

Various modifications of my invention will suggest themselves. It is possible, for example, to atomize a solution of a silicate by a blast of air or otherwise and introduce it into a heated zone so as to cause the rapid liberation of water and the puffing or swelling up of the particles as above described without first going through the steps of forming a solid and then grinding it to form particles of the desired size. I desire by the appended claims to cover all such modifications of my invention.

The softening point of the frothy pellets produced as above described may be raised by increasing the proportion of silica in the alkaline silicate. For example, in the ordinary commercial form the silicate known as water glass, the proportion is one molecule of $Na_2O$ to three molecules of $SiO_2$. The softening point of the material produced by the above described process may be raised from 350° C. to about 525° C. by using a silicate in which the proportions of base to silica is one molecule of $Na_2O$ to 3.8 molecule of $SiO_2$. This material is particularly valuable as a heat insulator because of its extremely low apparent density. It has a low heat capacity per unit volume. It is cleanly, non-combustible and is very easily prepared from inexpensive materials. The heat mean conductivity between the temperatures of 300° C. and 25° C. is .00012 calories per degree centigrade per second per centimeter. The heat conductivity of metallic silver in these units is given by Kohlrausch as 1.01. The material may also be used for decorative purposes and with this end in view may be dyed with various colors, the dye simply being added to the water glass solution. Beautiful diffused light effects may be obtained by surrounding an incandescent lamp by the material.

What I claim as new and desire to secure by Letters Patent of the United States, is,—

1. The process which consists in comminuting an alkali silicate containing combined water and then heating the silicate particles to a temperature at which said water is driven off with intumescence of said particles.

2. The process which consists in comminuting a solid soluble silicate and subjecting the separate particles to an elevated temperature to drive off water while agitating to prevent caking.

3. The process which consists in suddenly heating particles of a water-containing alkali silicate to a temperature at which the water is liberated with frothing and allowing the particles to puff up independently.

4. The process which consists in heating particles of a viscous material containing an easily vaporizable ingredient to a temperature at which said ingredient is rapidly vaporized and agiting said particles during said heating to cause said particles to swell without sticking to each other.

5. The process which consists in bringing a comminuted alkali silicate containing water into contact with a surface heated to temperature at which said water is rapidly eliminated and agitating said particles to prevent adhesion to each other or said surface.

6. A new manufacture comprising a material consisting of distinct, substantially anhydrous, frothy pellets of a soluble silicate.

7. A new manufacture comprising a material consisting of distinct substantially anhydrous frothy particles of a silicate of alkali metal.

8. A new manufacture comprising a material consisting of intumesced discrete bubbles of a dehydrated viscous material, said material having an apparent density of about .01 to .03 and a corresponding low heat conductivity and low heat capacity.

9. A new manufacture, comprising a mass of distinct frothy particles of silicate, which contains 1 molecule of base to 3.8 molecules of silica, said mass having an apparent density of about .01 to .03 and a low mean heat conductivity.

In witness whereof, I have hereunto set my hand this 6th day of January, 1912.

WALTER ARTHUR.

Witnesses:
 BENJAMIN B. HULL,
 HELEN ORFORD.